Oct. 15, 1957 W. A. WARD 2,809,771
BABY FOOD FEEDER
Filed Dec. 7, 1955
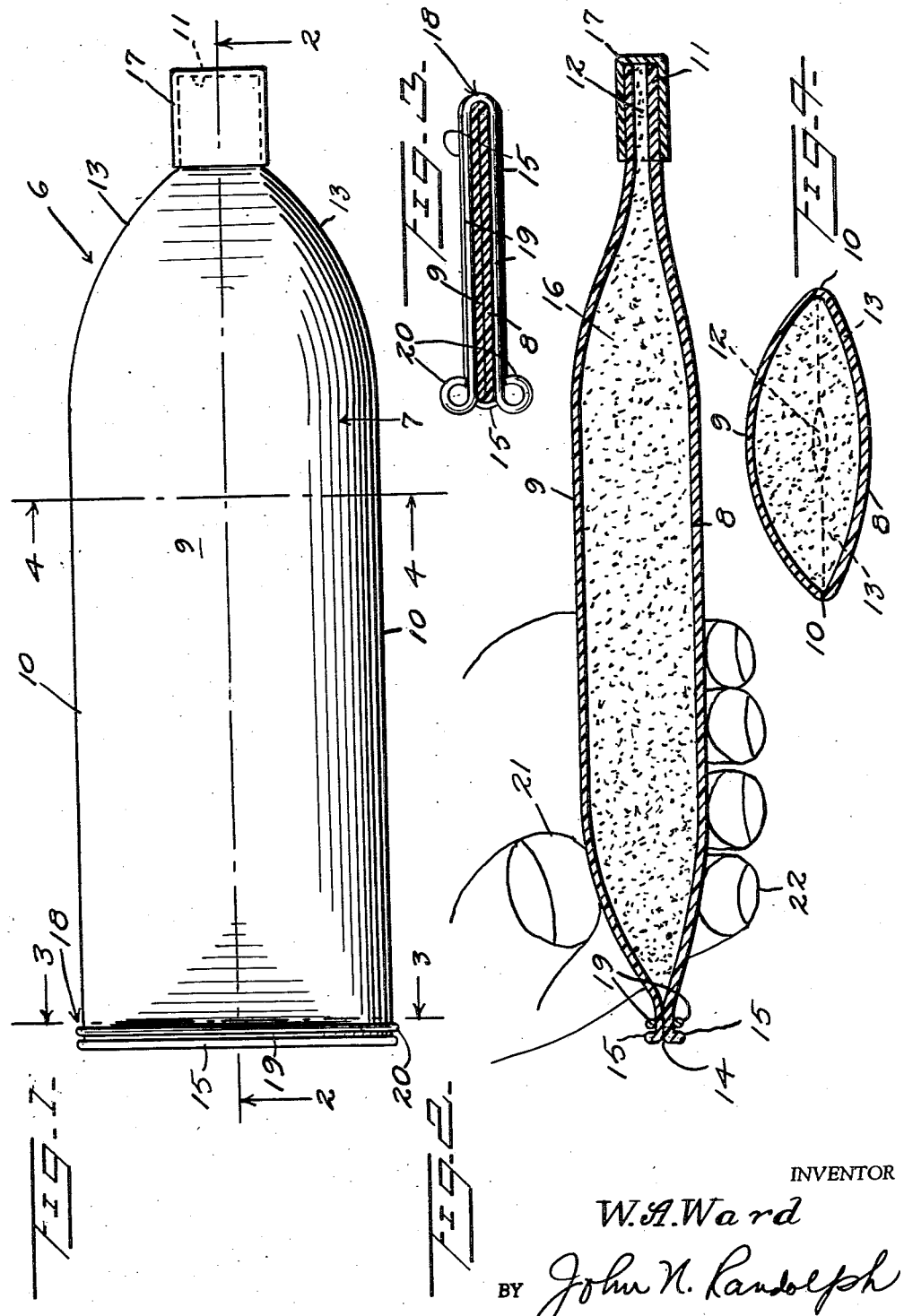
INVENTOR
W. A. Ward
BY John N. Randolph
ATTORNEY

United States Patent Office 2,809,771
Patented Oct. 15, 1957

2,809,771

BABY FOOD FEEDER

William A. Ward, Montgomery, Ala.

Application December 7, 1955, Serial No. 551,646

6 Claims. (Cl. 222—107)

This invention relates to a novel device for dispensing semisolid or strained baby food (not liquids) for feeding a baby such food by an extrusion method.

More particularly, it is a primary object of the present invention to provide a baby food feeder which readily adapts itself for use in feeding foods other than liquids and solids directly to a baby where conventional spoon feeding is not convenient, as while traveling.

A further object of the invention is to provide a feeder of the aforedescribed character of extremely simple construction which may be readily refilled, which is capable of being readily maintained in a clean and sanitary condition, and from which strained and semisolid baby foods may be readily extruded by pressure of the thumb and fingers for dispensing the food into the mouth of a baby.

Various other objects and advantages of the invention will hereinafter become more fully apparent from the following description of the drawing, illustrating a presently preferred embodiment thereof, and wherein:

Figure 1 is a top plan view of the baby food feeder;

Figure 2 is a longitudinal sectional view thereof, taken substantially along a plane as indicated by the line 2—2 of Figure 1, and Figures 3 and 4 are cross sectional views of the feeder, taken substantially along planes as indicated by the lines 3—3 and 4—4, respectively, of Figure 1.

Referring more specifically to the drawing, the novel baby food feeder in its entirety and comprising the invention is designated generally 6 and includes an elongated hollow container body, designated generally 7, preferably composed of a plastic material including a bottom wall 8 and a top wall 9. The walls 8 and 9 have integrally merging longitudinal side edges 10. The container body 7 includes a restricted rigid open forward end forming a nipple 11 having a bore of substantially oval shape in cross section as best seen in Figure 4 and designated 12. The longitudinal side edges 10 have complementary inwardly curved converging forward portions 13 whereby the forward end of the body 7 is restricted to form the nipple 11. The remainder of the body 7, rearwardly of the edge portions 13, is of substantially uniform cross sectional size and terminates in an open rear end 14. The walls 8 and 9 are externally thickened to provide an external bead 15 around the opening 14.

The body 7 may be formed of any suitable material which will not be damaged by heat and is preferably formed of a plastic material. While the bottom and top walls 8 and 9 are preferably formed integral with one another and of the same material, the bottom wall 8 possesses a substantially greater degree of rigidity than the top wall 9, which top wall is very flexible and substantially limber. The bottom wall 8 is preferably of sufficient rigidity so that it will not bend or fold crosswise, but so that when the container body 7 is filled with a semisolid or strained baby food 16, said bottom wall 8 can flex away from the top wall 9 to assume a transversely bowed shape, as illustrated in Figure 4.

The baby feeder 6 includes a substantially rigid cap 17, which may likewise be formed of plastic, of a proper size and shape to fit snugly over the nipple 11 to close and seal the bore 12 thereof. The cap 17 is retained on the nipple 11 by a friction engagement.

By applying pressure with the thumb and fingers to the longitudinal edges 10, adjacent the opening 14, said opening may be expanded to an open position, for example corresponding to the cross sectional shape of the body 7 as seen in Figure 4. The semisolid or strained baby food 16 may then be applied to the body 7 through the opening 14 in any suitable manner for filling the feeder 6. The opening 14 is then returned to and retained in a closed position by an elongated spring clip 18 having spaced substantially parallel elongated legs 19 for engaging the walls 8 and 9, adjacent the bead 15, for tightly closing said open end 14, as illustrated in Figures 2 and 3. The free ends of the legs 19 may be turned outwardly to form loop portions 20 by means of which the clip can be readily engaged for removing it from the container 7. The bead 15 prevents the clip 18 from sliding off of the open rear end 14 when pressure is applied to the walls 8 and 9 for extruding the food 16 from the nipple bore 12. The feeder 6 is capable of receiving the food 16 in a heated condition without being damaged by the heat thereof and it is also capable of being heated, as by being placed in hot water, for heating or re-heating the contents 16 thereof.

When it is desired to use the feeder 6, the nipple cap 17 is first removed after which the nipple is placed in the baby's mouth. The feeder may be held with either hand, preferably with the thumb extending across the top wall 9 and the fingers extending across the bottom wall 8, as illustrated in Figure 2. The thumb 21 and the index finger 22 are initially positioned adjacent the closed rear end 14 of the container body 7 and a squeezing pressure is exerted by the thumb and index finger on the walls 9 and 8, respectively, for restricting or contracting the chamber of the body 7 containing the food 16, so that the food will be extruded through the nipple bore 12 into the baby's mouth. This operation is continued intermittently to feed the food 16 at a desired rate into the mouth of the baby and the thumb and index finger are gradually advanced toward the nipple 11 as the rear end portion of the walls 8 and 9 are pressed into engagement with one another and as the supply of food 16 within the container 7 diminishes. It will be readily apparent that in this manner all or any desired portion of the food 16 may be dispensed or fed to a baby at a feeding.

After the contents 16 has been dispensed from the feeder 6, the clip 18 can be slidably removed and the opening 14 expanded to an open position, as previously described, so that the interior of the body 7 may be readily cleansed as by forcing a hot cleansing liquid therethrough, such as water. The cap 17 can then be replaced and the feeder 6 can then be refilled, as previously described.

Various modifications and changes are contemplated and may obviously be resorted to, without departing from the spirit or scope of the invention as hereinafter defined by the appended claims.

I claim as my invention:

1. A baby food feeder comprising an elongated container body having complementary deformable top and bottom walls integrally connected along longitudinal thereof to define a hollow chamber adapted to contain a semisolid or strained baby food, a substantially rigid nipple constituting an open restricted discharge forward end of said container, said container having an enlarged open opposite rear end through which the chamber thereof is adapted to be filled with the baby food, and means detachably and compressibly engaging said top and bottom walls adjacent said rear end of the container for closing and sealing the filling opening thereof, said top and bottom walls being adapted to be subjected to a squeezing or compressive force for extruding the baby food from the container through said nipple.

2. A baby feeder as in claim 1, said top wall being substantially limber and said bottom wall being substantially more rigid than the top wall to prevent a crosswise bending or folding of the container body.

3. A baby food feeder as in claim 2, said bottom wall being substantially thicker than the top wall, said bottom wall being outwardly bowed transversely to a lesser extent than the top wall when the container body is filled for possessing sufficient rigidity to resist bending or folding of the feeder when empty or partially empty.

4. A baby food feeder as in claim 1, said means for closing the filling end of the feeder comprising an elongated spring clip having spaced substantially parallel legs between which said top and bottom walls are compressively gripped when said spring clip is in an applied position across the container body.

5. A baby food feeder as in claim 4, said container body having an external bead surrounding the filling end thereof for engagement with said spring clip to prevent disengagement of the spring clip from the container body by a lengthwise sliding movement of the spring clip rearwardly of the container body.

6. A baby food feeder as in claim 1, and a cap detachably and frictionally engaging around said nipple for sealing the bore thereof.

References Cited in the file of this patent
UNITED STATES PATENTS

| | | |
|---|---|---|
| 1,538,797 | Grier | May 19, 1925 |
| 1,742,809 | Hoover | Jan. 7, 1930 |